US007104739B2

(12) United States Patent
Lagler

(10) Patent No.: US 7,104,739 B2

(45) Date of Patent: Sep. 12, 2006

(54) MILLING DISK FOR A FLOOR MACHINING APPLIANCE

(75) Inventor: Karleugen Lagler, Güglingen-Frauenzimmern (DE)

(73) Assignee: Eugen Laegler GmbH, Gueglingen-Frauenzimmern (DE)

( * ) Notice: Subject to any disclaimer, the term of this patent is extended or adjusted under 35 U.S.C. 154(b) by 52 days.

(21) Appl. No.: 11/040,462

(22) Filed: Jan. 21, 2005

(65) Prior Publication Data

US 2005/0226695 A1 Oct. 13, 2005

(30) Foreign Application Priority Data

Apr. 13, 2004 (DE) .................. 20 2004 006 169 U

(51) Int. Cl.

*B23C 1/20* (2006.01)
*B23C 3/00* (2006.01)
*B23C 5/20* (2006.01)

(52) U.S. Cl. ...................... 409/232; 409/181; 409/141; 451/350; 451/353; 299/41.1; 407/35; 407/41; 407/43; 407/46; 407/52; 407/61; 407/119

(58) Field of Classification Search ................ 409/175, 409/181–182, 232, 234, 141; 451/350, 353; 299/41.1, 36.1, 39.1; 407/33–35, 40–41, 407/43, 46–49, 51–52, 56, 61, 119

See application file for complete search history.

(56) References Cited

U.S. PATENT DOCUMENTS

| | | | | | |
|---|---|---|---|---|---|
| 3,106,011 | A | * | 10/1963 | Clifton et al. | 407/35 |
| 3,152,385 | A | * | 10/1964 | Wheldon, Jr. et al. | 407/119 |
| 3,347,596 | A | * | 10/1967 | Brejcha et al. | 299/41.1 |
| 4,529,338 | A | * | 7/1985 | Erkfritz | 407/35 |
| 4,614,380 | A | * | 9/1986 | Allen | 299/41.1 |
| 4,668,017 | A | * | 5/1987 | Peterson et al. | 299/41.1 |
| 4,743,144 | A | * | 5/1988 | Shikata | 407/42 |
| 4,758,050 | A | * | 7/1988 | Peterson et al. | 299/41.1 |
| 5,275,981 | A | * | 1/1994 | Nishiyama et al. | 501/87 |
| 5,409,299 | A | * | 4/1995 | Holder | 299/41.1 |
| 5,432,132 | A | * | 7/1995 | Dasgupta et al. | 501/97.2 |
| 5,439,413 | A | | 8/1995 | Lagler | |
| 5,662,436 | A | * | 9/1997 | Bishop | 407/35 |
| 5,683,143 | A | * | 11/1997 | Peterson et al. | 299/41.1 |
| 5,957,628 | A | * | 9/1999 | Bentjens et al. | 407/35 |
| 6,021,771 | A | * | 2/2000 | Swan et al. | 299/41.1 |
| 6,120,218 | A | * | 9/2000 | Bishop | 407/34 |
| 6,210,082 | B1 | * | 4/2001 | Connors et al. | 408/1 R |
| 6,932,548 | B1 | * | 8/2005 | Obrachta | 409/234 |

FOREIGN PATENT DOCUMENTS

DE 43 11 869 10/1994

* cited by examiner

*Primary Examiner*—Erica Cadugan

(74) *Attorney, Agent, or Firm*—Flynn, Thiel, Boutell & Tanis, P.C.

(57) ABSTRACT

A milling disk for a floor machining appliance has a plurality of mounts for holding interchangeable plate-like milling tips, the milling disk being driven for rotation by the floor machining appliance and being held substantially parallel to the substructure to be machined so that the milling tips may bite into the substructure and remove matter from the surface thereof. The milling tips are constituted by ceramic cutting tips.

29 Claims, 5 Drawing Sheets

MILLING DISK FOR A FLOOR MACHINING APPLIANCE

BACKGROUND OF THE INVENTION

The invention relates to a milling disk for a floor machining appliance comprising a plurality of milling means mounts for interchangeable disk-like milling means, such milling disk being driven for rotation thereof during operation by the floor machining appliance and being moved essentially parallel to the substructure to be machined so that the milling means may bite into the substructure and machine away the surface thereof. Moreover, the invention relates to a floor machining appliance having such a milling disk.

THE PRIOR ART

Floor machining appliances may be adapted for different applications. For instance, for stripping off parquet material a disk is arranged on the floor machining appliance on which sanding disks of sandpaper are attached. Furthermore brush disks with bristles of natural hair or wire brushes may be employed with the floor machining appliance. For the preparation of substructures or underfloors, for example for the removal of traces of adhesive or the like a milling disk is known in the art, on which reversible metallic carbide disks may be mounted.

It has turned out to be a disadvantage that such reversible metallic carbide disks are subject to rapid wear in many applications, their cutting edges becoming blunt or scored or the like.

SHORT SUMMARY OF THE INVENTION

Accordingly one object of the present invention is to provide a milling disk or, respectively, a floor machining appliance fitted with such a disk, of the initially described type more especially suitable for work on hard substructures as for instance hard floors.

In order to achieve these and/or other objects appearing from the present specification, claims and drawings, in the present invention the milling means are constituted by ceramic cutting tips. The ceramic cutting tips are able to cope with heavier loads than metallic carbide cutting tips and more particularly they are tougher. The cutting edges of the ceramic cutting tips are subject to substantially less wear than those of metallic carbide cutting tips. One design of the ceramic cutting tips as reversible ceramic cutting tips, for example in the form of cuboid cutting tips, leads to the convenient possibility of repeated use of the cutting tips. For instance, the cuboid ceramic cutting tips have eight cutting faces.

The ceramic cutting tips are preferably provided for working on the substructure with a shaving action and are accordingly held at an angle suitable for shaving the substructure by the milling means mounts. The cutting edge(s) of the ceramic cutting tips is or are best constituted by faces which are respectively generally at a right angle to each other, that is to say the respective first flank and the eake face are generally at a right angle to one another.

The milling means mounts are preferably set back in relation to the bottom face of the milling disk so that the ceramic cutting tips partly project downward past the bottom face of the milling disk. Preferably, the ceramic cutting tips are substantially protected by the body of the milling disk so that essentially the cutting edges of the ceramic cutting tips protrude downward past the milling disk.

Various different advantageous features are utilized to ensure smooth running of the floor machining appliance and/or for a smooth milling action on the substructure:

Preferably at least two of the milling means mounts are arranged at a different radial distance from the center of rotation of the milling disk. It is more especially preferred for several, that is to say at least two, milling means mounts to be arranged along a row line adjacent to each other. Such row or in-line arrangements are preferably distributed in a stellate manner over the bottom face of the milling disk, something apt to lead to smooth running of the milling disk.

It is possible for the milling means mounts to be fitted with the ceramic cutting tips in different manners so that for hard substructures radially outward lying milling means mounts are fitted with cutting tips. For soft substructures it is preferred additionally for milling means mounts lying farther inward to be armed with ceramic cutting tips.

It has turned out to be advantageous if the row axis or line of an in-line extends at an angle to a radial line so that during operation of the milling disk one ceramic cutting tip, which is farther removed for the center of rotation, will bite into the substructure to be worked before a ceramic cutting tip, which is nearer the center of rotation of the milling disk. The milling means mounts, which is radially to the outside in the operating direction of the rotary disk, will be nearer the radial line than a radially inner milling means mounts. This design favors handling of the floor machining appliance. It will be clear that a reversed design is possible, in the case of which the ceramic cutting tip farther to the outside will cut into the substructure after the ceramic cutting tip which is farther inward, something which favors removal of swarf or chips.

Furthermore, it is preferred for the ceramic cutting tips to be so obliquely held by the milling means mounts that the cutting edges of the ceramic cutting tips are oblique in relation to a radial line on the milling disk. It is preferred for the cutting edge to be farther removed from a radial line nearer the center of the disk than farther outward. This measure among other things contributes to satisfactory removal of swarf.

Removal of swarf or chips is also facilitated by preferred measures now to be described. At each milling means mount there is preferably a swarf or chip receiving space, i.e. a free space available for swarf. Moreover it is an advantage to have swarf removal passages, one swarf removal passage being provided for respectively one or more milling means mounts, for example an in-line arrangement of milling means mounts. As related to a radial line each respective swarf removal passage preferably extends obliquely, it being radially to the outside in the direction of rotation in operation of the milling disk farther removed from the radial line than radially farther inward or vice versa.

For holding the ceramic cutting tips the milling means mounts for example bear clamping holders for clamping or screwing on the ceramic cutting tips. In the case of the screw means a screw may for instance extend through the respective ceramic cutting tip.

It is particularly preferred to have an at least partly elastic arrangement of the milling means mounts on the bottom face of the milling disk. This measure constitutes a feature considered to be a subcombination patentable in its own right on floor machining appliances for processing floor by milling. It is will be clear that only one part of the milling means mounts may be elastically borne on the bottom face of the milling disk. For instance, the milling means mounts may be arranged on the bottom face of the milling disk with the intermediate placement of an elastic intermediate layer. The elastic intermediate layer may for example include a burr attachment means, a rubber mat or the like.

As already explained the ceramic cutting tips are mounted in an interchangeable manner on the milling disk. For rapid interchange the preferred modular principle may be employed as described infra.

One or more milling means mounts are in this case arranged on an interchangeable carrying element, an in-line arrangement of the milling means mounts on the carrying element being preferred. On the milling disk a plurality of carrying elements are present, on which the interchangeable carrying elements may be arranged. It is in this manner that a plurality of ceramic cutting tips may be arranged on the milling disk with a simple design. The carrying element may be fitted with new ceramic cutting tips while removed from the milling disk or, respectively, the ceramic cutting tips may be turned over while removed from the milling disk so that the milling disk may be furthermore operated with the ceramic cutting tips still on it. The carrying element mounts are preferably distributed peripherally about the milling disk, it being preferred to have equal radial angles between the carrying element mounts. For instance a stellate arrangement of the carrying element mounts is advantageous.

The carrying element mounts are preferably set back in relation to the bottom face of the milling disk.

The carrying elements are for example screwed on the carrying element mounts or, respectively, set in the mounts. However an elastic or resilient attachment is possible, for example by the intermediary of a burr fastener tape, an elastic intermediate layer consisting f. i. of elastic plastic in between the carrying element and the carrying element mount.

Advantageously an interchangeable additional weight is present on the milling disk. It will be clear that additional weights with different weight graduations are possible so that dependent on the particular application a heavier or a lighter additional weight may be mounted on the milling disk. The additional weight is for example attached to a carrying disk of the milling disk, for example by screw means, by clamping means or the like.

In principle it would be possible to arrange the additional weight on the top of the milling disk. It is particularly preferred however to have an arrangement at the bottom, this meaning a low position of the center of gravity.

The additional weight is preferably in the form of a plate or disk. Preferably, it essentially constitutes the bottom face of the milling disk, past which the ceramic cutting tips preferably extend in part. The additional weight is preferably stellate in shape with intermediate spaces radiating in a suitable distribution and in which the milling means mounts are arranged. The intermediate space for example constitute the carrying element mounts for the interchangeable carrying elements.

The milling disk is preferably attached to the floor machining appliance in an interchangeable fashion, for example by screw or clamping means or the like. It is however more especially preferred to have a bayonet attachment means in the case of which the milling disk may be rapidly attached to the floor machining appliance and, respectively, removed from it.

The milling disk preferably essentially comprises oxidation-resistant material, more particularly stainless steel. This renders possible simple cleaning of the milling disk, for example in a solvent bath, in water or the like.

The ceramic cutting tips may comprise diamond fragments and/or metallic carbide fragments or other additives. It will be clear that a mixed arming of the milling disk with plain ceramic cutting tips and ceramic cutting tips having additional components is possible.

The milling disk in accordance with the invention may with advantage be provided with different milling means, for example with metallic carbide milling disks or with milling disks which are coated with metallic carbide or diamond. Furthermore milling studs, milling disks, on which a metallic carbide cutting edge is arranged, for example by soldering, or the like are possible.

The milling disk preferably has milling means adapted to penetrate to different degrees into the substructure. This may for example be achieved by milling means with a suitable overall length. It is also advantageous that the milling means mounts hold the milling means at different depths of penetration so that for example milling means of the same sort penetrate, in the mounted condition, the substructure to different degrees. It is particularly preferred for one or more ceramic cutting tips to penetrate more deeply into the substructure than "cutting" milling means, as for example one or more metallic carbide cutting tips. This design, in which a ceramic cutting tip bites more deeply into the substructure than a metallic carbide cutting tip constitutes a subcombination and an invention in its own right in the floor machining appliance art. The ceramic cutting tip(s) preferably has or have a negative cutting angle, and the at least one metallic carbide cutting tip have a positive cutting angle.

The floor machining appliance in accordance with the invention preferably has a powerful drive as for example an electric motor of 1,000 to 1,500 watts.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

FIG. 1 a view from below of a floor machining appliance in accordance with the invention fitted with a milling disk in accordance with the invention.

DETAILED ACCOUNT OF WORKING EMBODIMENT OF THE INVENTION

Figure 1:
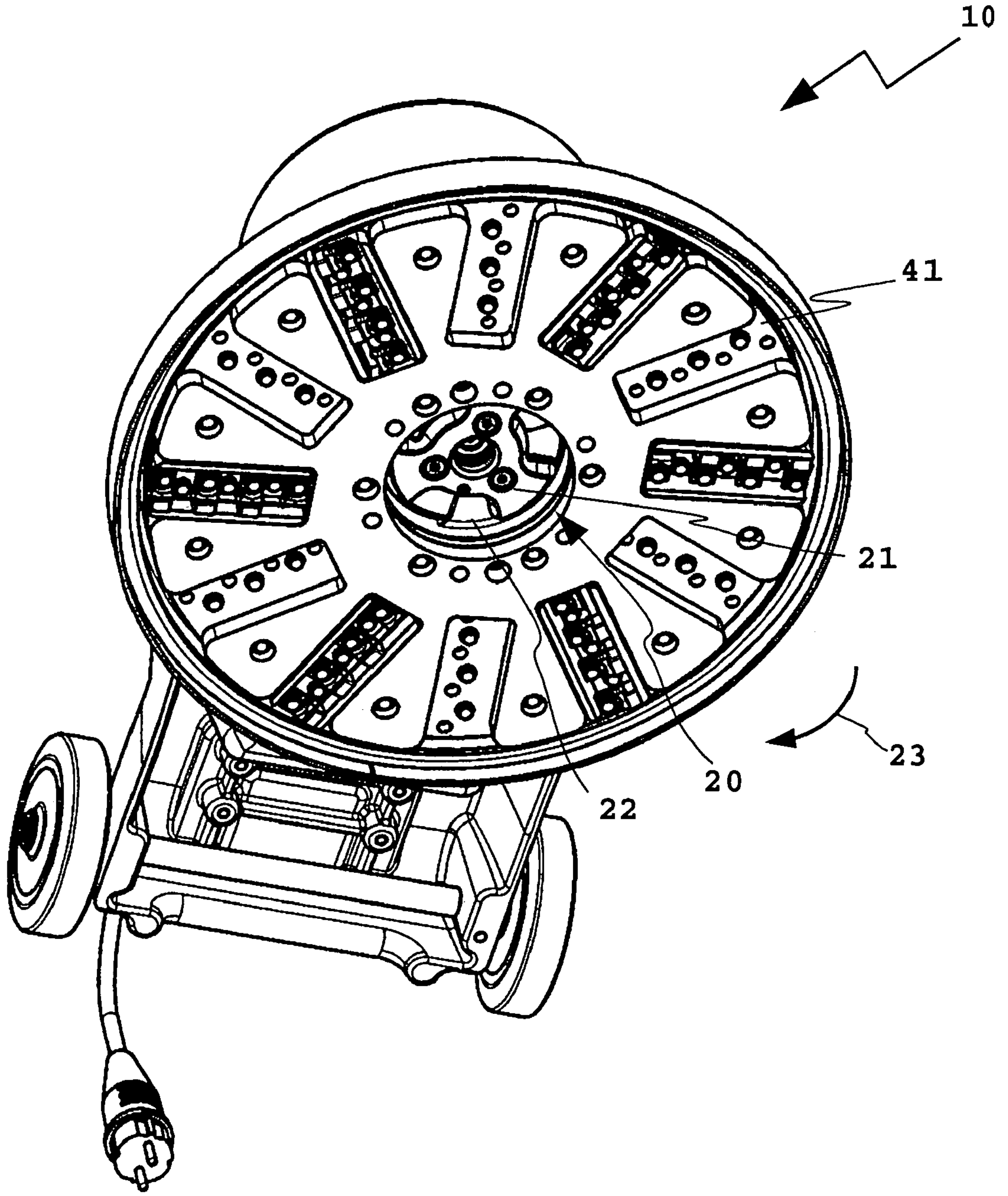
Figure 2:
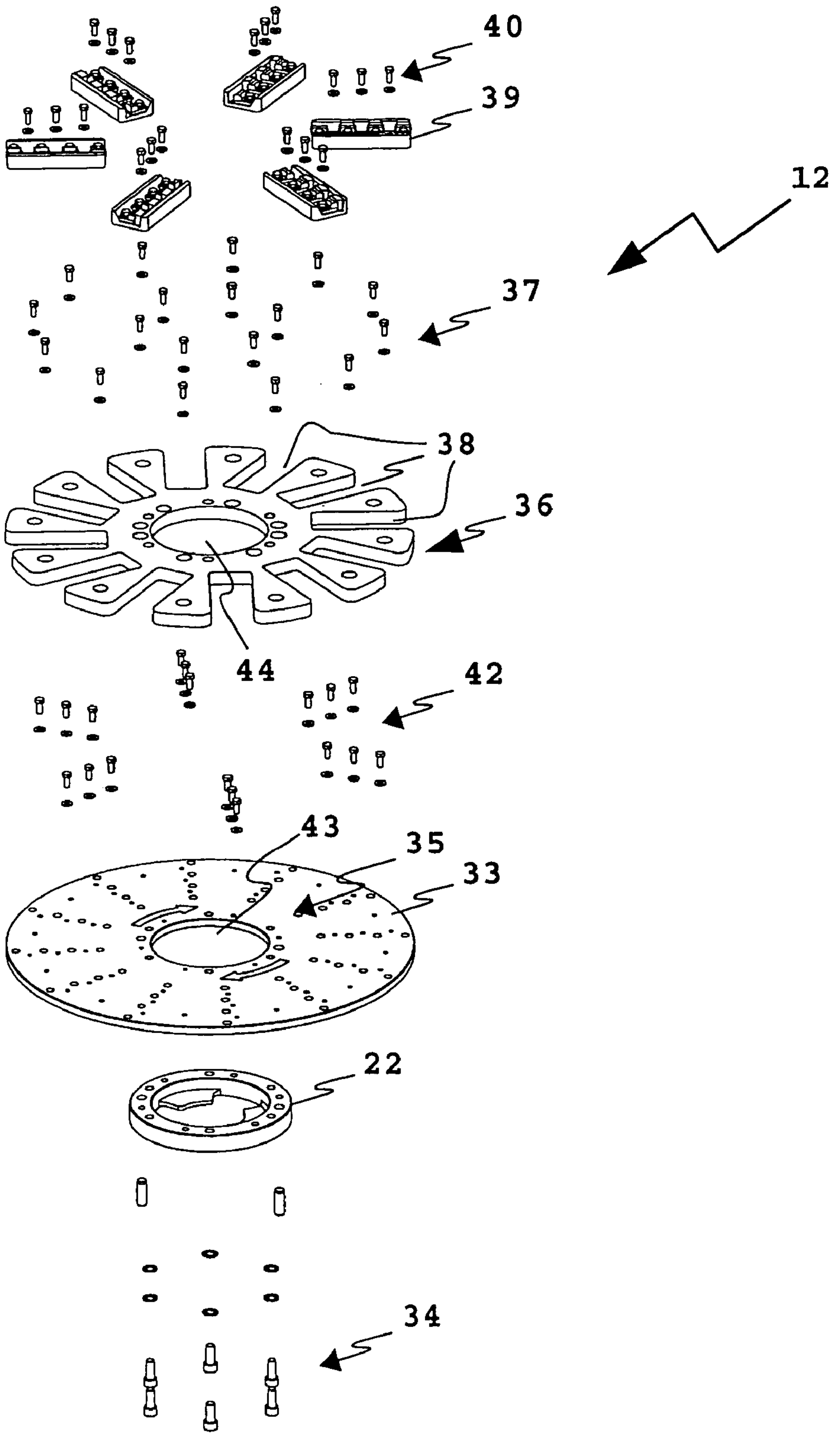
FIG. 2 is an exploded view of the milling disk in accordance with FIG. 1.
Figure 3:
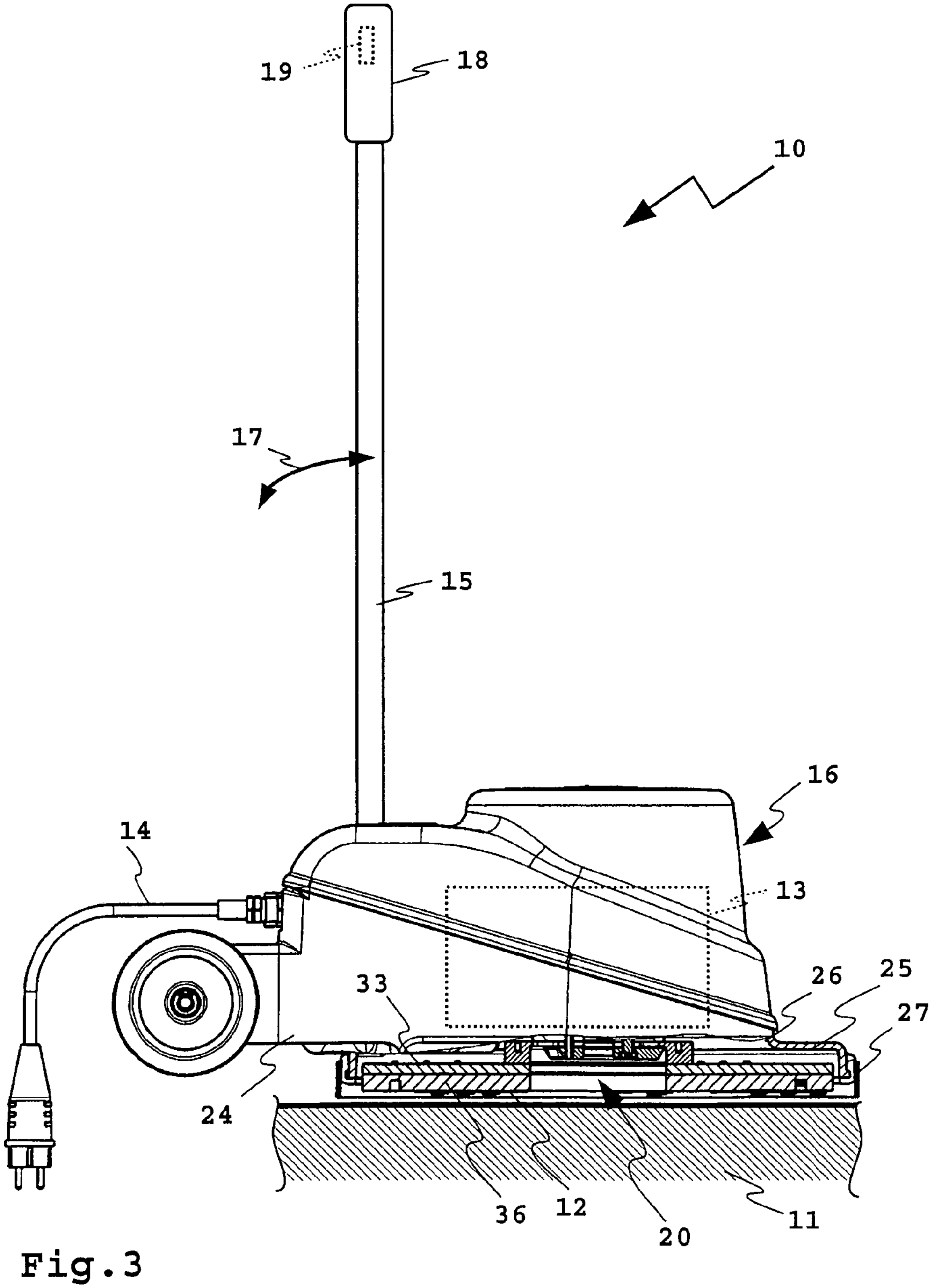
FIG. 3 is a lateral and partly sectioned representation of the floor machining appliance of FIG. 3.

A floor machining appliance 10 for a floor 11 possesses a milling disk 12 at the bottom, such disk being driven by a drive 13, as for example an electric motor in rotation. The drive 13 is supplied with electric power by way of a cable 14. The milling disk 12 is moved essentially in parallelism to the substructure 11 or floor. For operator movement of the floor machining appliance 10 there is a rod-like guide means 15, which is arranged on a base part 16 pivotally (indicated by an arrow 17). At the top, free end of the guide means 15 a handle 18 is arranged. On the handle 18 there are one or more electrical switches for switching the drive 13 on and off. The safety orientated switching means 19 is in the form of a switching means provided for example with a switching instrumentality requiring operation with both hands. Moreover here the machine possesses a setting lever (not illustrated) for releasing and/or arresting the pivotal motion of the guide means 15.

The milling disk 12 is attached at the bottom to the base part 16 by way of an attachment means 20. A bayonet socket in the form of a bayonet spigot 21, which is locked in rotation with the drive 13, fits in a bayonet connecting means in the form of a bayonet ring 22 on the milling disk 12. The locking of the bayonet ring 22 to the bayonet spigot 21 takes place against the direction 23 of rotation of the milling disk 12 or, respectively, of the drive 13 so that the attachment means 20 is self-locking.

A housing 24 of the base part 16 forms a bottom hood 25 at the lower side. The hood 25 delimits a milling disk receiving space 26 for the milling disk 12. The hood 25 prevents the operator of the floor machining appliance 10 touching the rotating milling disk 12. On the outer periphery of the hood 25 a fender means 27 of elastic material, as for example plastic, rubber or the like may be provided.

On the bottom side of the milling disk 12 milling means mounts 28 are arranged, which hold ceramic cutting tips 29. The ceramic cutting tip 29 serve as milling means and bite into the substructure 11, when the milling disk 12 is driven in rotation. The milling means mounts clamp onto the ceramic cutting tips 29.

The milling means mounts 28 are grouped as in-line arrangements 30, four milling means mounts 28 being in the present case arranged in line along a row axis 31.

Figure 7:
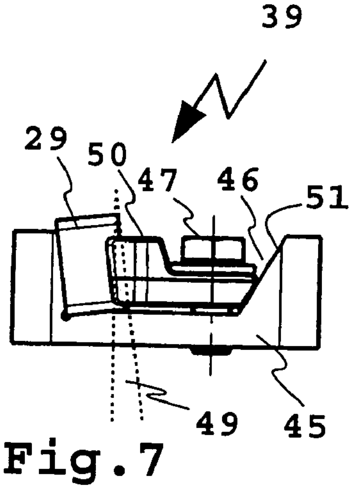
FIG. 7 is a side view of the carrying element according to FIG. 6.
Figure 8:
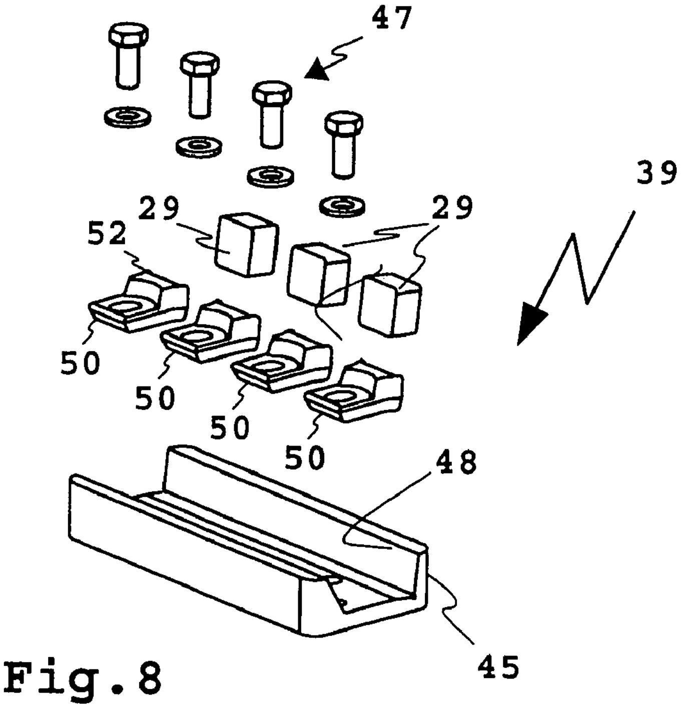
FIG. 8 is a exploded view of the carrying element of FIGS. 6 and 7.

The ceramic cutting tips 29 are in the present case in the form of cuboid. Their cutting or milling edges are constituted by faces which are essentially at a right angle to each other (see for example FIG. 7).

Figure 4:
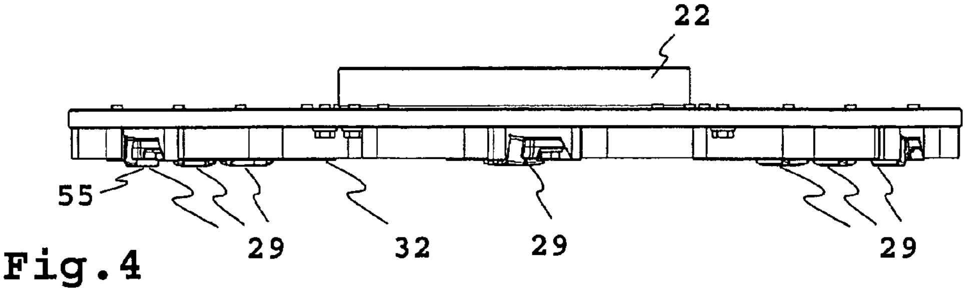
FIG. 4 is a side view of the milling disk of FIG. 1.
Figure 5:
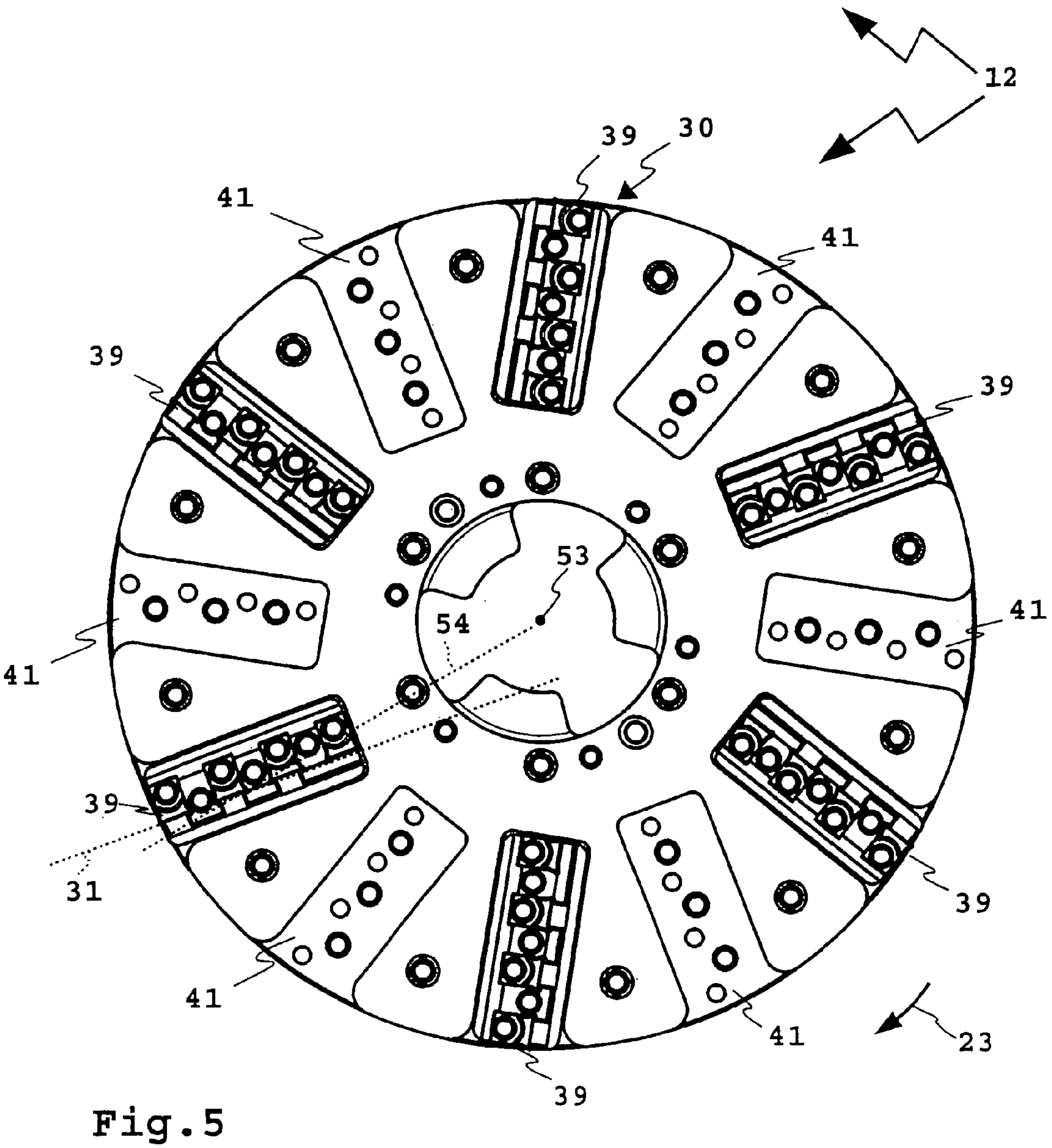
FIG. 5 is a view from below of the milling disk of FIG. 1.
Figure 6:
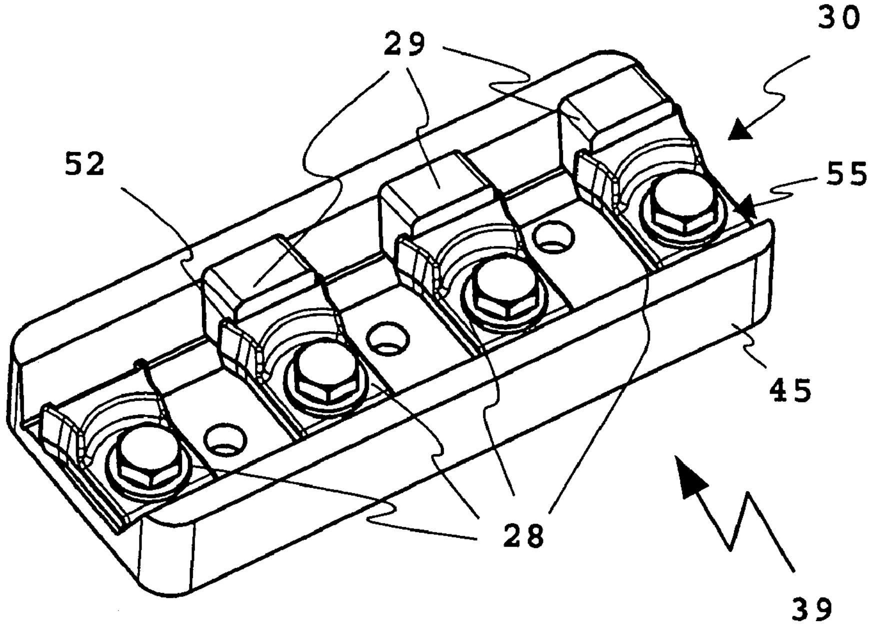
FIG. 6 shows a carrying element having a plurality of ceramic cutting tips in accordance with the preceding figures in a perspective elevation.

The milling means mounts 28 are set back in relation to the bottom side of the milling disk 12 so that the ceramic cutting tips 29 only partially extend downward past the bottom face 32 of the milling disk 12. This is more particularly indicated in FIG. 4.

The carrying disk 33 constitutes as it were the base of the milling disk 12. The bayonet ring 22 is attached at the top to the carrying disk 33, for example by means of studs 34 such as screws, by screwing to the same. For this purpose the carrying disk 33 has screw sockets 35 for example, which are preferably holes having female screw threads. There is a number of the screw sockets 35 and accordingly this renders possible substantial adaptability as regards arming the milling disk 12 with milling means.

The screw sockets 35 serve for example for the attachment of an additional weight 36 on the bottom side of the carrying disk 33 by means of studs 37, for example screws. The carrying disk 33 and the additional weight 36 are in the present case like plates or boards. The additional weight 36 ensures a low center of gravity of the floor machining appliance 10 and, respectively, of the milling disk 12. The additional weight 36 helps the ceramic cutting tips 29 to bite into the substructure 11 and therefore optimum removal of material therefrom.

In the intermediate spaces 38 of the additional weight 36 carrying element 39 can be attached, for example by way of studs 40, e.g. screws, which are screwed into the screw sockets 35 in the carrying disk 33. The milling disk 12 is in the working example fitted with six carrying elements 39, the maximum number of fitted carrying elements 39 being twelve. It will be clear that furthermore less than six carrying elements 39 may be mounted on the carrying disk 3. The intermediate spaces 38 in the additional weight 36 and furthermore in the carrying disk 33 delimit carrying element mounts 41 for the carrying elements 19. At carrying element mounts 41 not fitted with carrying element 39 it is possible for further guard studs 42, for example screws, to be screwed into the screw sockets present at the respective carrying element mounts 35 so that during operation of the disk 13 they are not fouled, for example by parts of the substructure from which material is removed by the milling disk 12.

In the carrying disk 33 and on the additional weight 36 through openings 43 and 44 are present, through which the bayonet spigot 21 may fit.

The milling disk 12, more especially the carrying disk 33, the additional weight 36 and the carrying elements 39 are in the present case made essentially or completely of stainless steel, something which facilitates cleaning, for example using organic solvents, or with water or the like.

The carrying elements 39 each have an in-line arrangement 30 of the milling means mounts 28. The carrying elements 39 comprise a carrying part 45, which is designed as a sort of section element. The carrying part 45 is for example a milled part, although an extruded design is certainly also possible. The carrying part 45 has a groove 46 extending along the row line 31, and in the groove four milling means mounts 28 can be secured using for example screws with washers 47. The groove 46 constitutes a recess, which completely contains the milling means mounts 28 so that only the ceramic cutting tips 29 have their respective cutting edges projecting downward past the respective carrying element 39.

The ceramic cutting tips 29 abut a side wall 48 of the groove 46 lying to the fore in the direction 23 of rotation. The side wall 48 is inclined in accordance with a preferred rake angle 49 so that the cutting tips shave rather than cut the substructure. Clamping holder means 50 which are screwed to the carrying part 45 by the studs 47, clamp the cutting tips 29 to the carrying part 45. The groove 46 has a cross section tapering toward its bottom. The clamping holders 50 have cross section corresponding to this cross section, the distance from the side wall 48 being defined for the cutting tips 29. The clamping holders 50 clamp the cutting tips 29 fast against the carrying element 39 on screwing in the studs 47 and bear on the one hand against the cutting tips resting against the side wall 48 and on the other hand against the side wall 52 of the groove 46, which is opposite to the side wall 48. The clamping holders 50 fit around the cutting tips 29 laterally by means of holding projections 52.

The in-line arrangements 30 or, respectively, the carrying elements 39 are able to be evenly arranged around the periphery of the milling disk 12 on the carrying disk 33.

The respective receiving means or mounts 28 of an in-line arrangement 30 have differing radial distances from the center 53 of rotation of the milling disk 12. Accordingly radially outer cutting tips 29 more at a higher speed than radially inner cutting tips 29. The radially outer cutting tips 29 machine away the substructure 11 at a higher rate than the radially inner cutting tips 29. In this connection it is to be noted that the drive 13 runs the milling disk 12 at preferably 160 to 200 or more especially 180 rpm, other speeds of rotation also being possible.

The cutting edges of the cutting tip 29 are in the present case arranged to come into engagement with the substructure 11 in a cascade. The radially outer cutting edges 29 on the milling disk 12 engage the substructure 11 prior to the cutting edges of the radially inner cutting tips 29. This is caused because the (approximately) radial lines 31 are set at an angle to a respectively associated (true) radial line 54. The cutting edges of the cutting tips 29 of an in-line 10 extend along the row line 31 so that these cutting edges extend obliquely to the radial line 54

For optimum removal of swarf, swarf removal passages 55 are provided. The swarf removal passages 55 extend in the grooves 46 radially outward and open at the outer periphery of the milling disk 12.

The invention claimed is:

1. A milling disk for a floor machining appliance comprising a plurality of milling means mounts for interchangeable milling means, such milling disk being driven for rotation thereof during operation by the floor machining appliance and being moved essentially parallel to the substructure to be machined so that the milling means may bite into the substructure and machine away the surface thereof, wherein the milling means is constituted by ceramic cutting tips, wherein at least two of the cutting tips are arranged at different radial distances from the center of rotation of the milling disk, and further comprising at least one plate-like weight arranged beneath the milling disk, said at least one plate-like weight having a stellate configuration with intermediate spaces distributed in a radiating manner in which the milling means mounts are arranged.

2. The milling disk as set forth in claim 1, wherein the milling means mounts are adapted to hold the ceramic cutting tips at an angle suitable for machining of the substructure by shaving.

3. The milling disk as set forth in claim 1, wherein the ceramic cutting tips each have respectively at least one cutting edge formed by two faces generally at a right angle to one another.

4. The milling disk as set forth in claim 1, wherein the milling means mount are set back in relation to the bottom side of the milling disk so that the ceramic cutting tips partially extend downward past beyond the bottom side of the milling disk.

5. The milling disk as set forth in claim 1, wherein the milling means mounts so hold the ceramic cutting tips that their cutting edges extend obliquely as related to a radial line on the milling disk.

6. The milling disk as set forth in claim 1, wherein at least two of the milling means mounts are arranged at different radial distances from the center of rotation of the milling disk.

7. The milling disk as set forth in claim 6, wherein at least two milling means mounts are arranged in a row adjacent to one another along a row line.

8. The milling disk as set forth in claim 7, wherein the line of the row extends at an angle in relation to a radial line so that during operation of the milling disk a ceramic cutting tip on a milling means mount, which is closer to the center of rotation of the milling disk, engages the substructure to be machined after a ceramic cutting tip which is farther removed from the center of rotation.

9. The milling disk as set forth in claim 1, comprising means defining a swarf receiving space adjacent to each respective milling means mount and/or at least one swarf removal passage for the removal of swarf machined from the substructure.

10. The milling disk as set forth in claim 9, wherein the at least one swarf removal passage extends obliquely in relation to a radial line, the swarf removal passage being farther removed radially outward in the operating direction of rotation of the milling disk from the radial than radially inward.

11. The milling disk as set forth in claim 1, wherein the milling means mounts comprise clamping holding means for clamping the ceramic cutting tips.

12. The milling disk as set forth in claim 11, wherein the milling means mounts comprise screw means for screwing the clamping holding means in place.

13. The milling disk as set forth in claim 1, comprising at least one interchangeable carrying element on which at least one of the milling means mounts is present.

14. The milling disk as set forth in claim 13, which the at least one carrying element possesses at least two of the milling means mounts arranged in line.

15. The milling disk as set forth in claim 14, comprising a plurality of the interchangeable carrying elements.

16. The milling disk as set forth in claim 15, wherein said interchangeable carrying elements are distributed about the rotational periphery of the milling disk with an equal spacing apart.

17. The milling disk as set forth in claim 14, wherein said milling means mounts are arranged in a stellate manner on the bottom side of the milling disk.

18. The milling disk as set forth in claim 14, wherein said milling means mounts are set back in relation to the bottom side of the milling disk.

19. The milling disk as set forth in claim 1, wherein the at least one plate-like weight is interchangeable.

20. The milling disk as set forth in claim 19, wherein the at least one weight essentially constitutes the bottom side of the milling disk.

21. The milling disk as set forth in claim 1, adapted to be attached in an interchangeable fashion on the floor machining appliance.

22. The milling disk as set forth in claim 21, comprising a bayonet attachment means for attachment to the floor machining appliance.

23. The milling disk as set forth in claim 1 wherein a carrying disk of the milling disk consists essentially of oxidation resistant material.

24. The milling disk as set forth in claim 1, wherein said ceramic cutting tips at least in part comprise diamond fragments and/or metallic carbide fragments.

25. The milling disk as set forth in claim 1, wherein the milling means mounts are at least in part designed for holding the milling means at a negative cutting angle.

26. The milling disk as set forth in claim 1, comprising at least one metallic carbide cutting tip and/or a cutting tip coated with metallic carbide or diamond and/or a cutting tip having metallic carbide cutting edge.

27. The milling disk as set forth in claim 1, comprising at least one metallic carbide cutting tip.

28. A floor machining appliance comprising a milling disk as set forth in claim 1, the floor machining appliance having a suitable drive for the operation of the milling disk.

29. The milling disk as set forth in claim 1 wherein a carrying disk of the milling disk consists essentially of stainless steel.

* * * * *